(12) United States Patent
De Mondt et al.

(10) Patent No.: US 9,453,134 B2
(45) Date of Patent: Sep. 27, 2016

(54) RECYCLING OF RADIATION CURED PRINTED MATTER

(71) Applicant: AGFA GRAPHICS NV, Mortsel (BE)

(72) Inventors: Roel De Mondt, Mortsel (BE); Johan Loccufier, Mortsel (BE); Hubertus Van Aert, Mortsel (BE)

(73) Assignee: AGFA GRAPHICS NV, Mortsel (BE)

( * ) Notice: Subject to any disclaimer, the term of this patent is extended or adjusted under 35 U.S.C. 154(b) by 0 days.

(21) Appl. No.: 14/419,280

(22) PCT Filed: Aug. 9, 2013

(86) PCT No.: PCT/EP2013/066714
§ 371 (c)(1),
(2) Date: Feb. 3, 2015

(87) PCT Pub. No.: WO2014/032936
PCT Pub. Date: Mar. 6, 2014

(65) Prior Publication Data
US 2015/0210870 A1    Jul. 30, 2015

Related U.S. Application Data

(60) Provisional application No. 61/694,787, filed on Aug. 30, 2012.

(30) Foreign Application Priority Data

Aug. 27, 2012   (EP) ..................................... 12181848

(51) Int. Cl.
| | | |
|---|---|---|
| C09D 11/101 | (2014.01) | |
| C09D 11/38 | (2014.01) | |
| C09D 4/06 | (2006.01) | |
| C09D 123/02 | (2006.01) | |
| C08L 23/02 | (2006.01) | |

(52) U.S. Cl.
CPC .............. *C09D 11/101* (2013.01); *C08L 23/02* (2013.01); *C09D 4/06* (2013.01); *C09D 11/38* (2013.01); *C09D 123/02* (2013.01)

(58) Field of Classification Search
CPC  B41M 5/0017; B41M 5/506; B41M 5/5209; B41M 5/5218; B41M 5/5227
See application file for complete search history.

(56) References Cited

U.S. PATENT DOCUMENTS

| | | | |
|---|---|---|---|
| 4,035,320 A | | 7/1977 | Lawson |
| 5,145,733 A * | | 9/1992 | Kadokura .................... 428/551 |
| 5,342,860 A | | 8/1994 | Plotkin et al. |
| 6,372,827 B2 * | 4/2002 | Johnson ........................ 156/278 |
| 6,402,823 B1 * | 6/2002 | Garcia Sainz et al. ..... 106/31.95 |
| 2001/0040593 A1 * | 11/2001 | Horiuchi ............................. 347/1 |
| 2002/0086168 A1 * | 7/2002 | Sadvary ................. B82Y 30/00 428/447 |
| 2002/0156144 A1 | 10/2002 | Williams et al. |
| 2003/0203184 A1 * | 10/2003 | Sunderrajan et al. ...... 428/317.9 |
| 2003/0211293 A1 * | 11/2003 | Nemoto et al. ................ 428/195 |
| 2006/0240201 A1 * | 10/2006 | Tachibana et al. ......... 428/32.21 |
| 2007/0066699 A1 | 3/2007 | Kohno et al. |
| 2007/0248827 A1 * | 10/2007 | Rukavina ............ B32B 17/1077 428/412 |
| 2010/0039463 A1 * | 2/2010 | Van Thillo ................ B41J 2/175 347/9 |
| 2010/0210745 A1 * | 8/2010 | McDaniel .............. C09D 5/008 521/55 |
| 2010/0313782 A1 | 12/2010 | Loccufier et al. |
| 2010/0330296 A1 * | 12/2010 | Loccufier et al. ............ 427/511 |
| 2011/0124768 A1 * | 5/2011 | Claes et al. ................... 522/182 |

FOREIGN PATENT DOCUMENTS

| | | |
|---|---|---|
| EP | 0 703 282 A2 | 3/1996 |
| EP | 2 053 100 A1 | 4/2009 |
| EP | 2 349 730 A1 | 8/2011 |
| JP | 54-160491 A | 12/1979 |
| WO | 2008/064248 A2 | 5/2008 |
| WO | 20121003186 A1 | 1/2012 |

OTHER PUBLICATIONS

Official Communication issued in International Patent Application No. PCT/EP2013/066714, mailed on Sep. 2, 2013.

* cited by examiner

*Primary Examiner* — Kristal Feggins
*Assistant Examiner* — Kendrick Liu
(74) *Attorney, Agent, or Firm* — Keating and Bennett, LLP

(57) ABSTRACT

A free radical curable liquid having a specific weight after curing measured at 25° C. of less than 1.00 g/cm$^3$ including: a) one or more photoinitiators; b) one or more free radical polymerizable monomers or oligomers; and c) hollow particles and/or a free radical crosslinkable polymer selected from the group consisting of polyethylene, polypropylene, polybutadiene, polymethylpentene, poly(ethylene-vinylacetate), poly(ethylene-ethyl acrylate) and poly(styrene-butadiene) and copolymers thereof; wherein at least the free radical crosslinkable polymer or at least one of the one or more free radical polymerizable monomers or oligomers includes one or more hydrolyzable groups which upon hydrolyzation form an acid group or salt thereof; and wherein the free radical curable liquid contains no more than 10 wt % of organic solvent.

13 Claims, No Drawings

RECYCLING OF RADIATION CURED PRINTED MATTER

CROSS-REFERENCE TO RELATED APPLICATIONS

This application is a 371 National Stage Application of PCT/EP2013/066714, filed Aug. 9, 2013. This application claims the benefit of U.S. Provisional Application No. 61/694,787, filed Aug. 30, 2012, which is incorporated by reference herein in its entirety. In addition, this application claims the benefit of European Application No. 12181848.8, filed Aug. 27, 2012, which is also incorporated by reference herein in its entirety.

BACKGROUND OF THE INVENTION

1. Field of the Invention

The present invention relates to the recycling of substrates printed with radiation curable inks, more particularly with radiation curable inkjet inks.

2. Description of the Related Art

Printing systems, such as offset and flexography, are being increasingly replaced for packaging applications by industrial inkjet printing systems due to their flexibility in use, e.g. variable data printing allowing last minute advertising changes on the packaging, and due to their enhanced reliability, allowing their incorporation into production lines. Radiation curable inkjet inks are particularly preferred because high quality images can be printed on non-absorbing ink-receivers, such as e.g. glass and plastic packaging materials. For example, WO 2008/064248 (PLASTIPAK) discloses digital printing on a plastic container having a non-planar external surface of a digital image of UV curable ink droplets that vary in diameter from 10 to 200 microns and wherein the droplets of ink range from 200 to 1200 drops per inch.

Currently PET bottles have digitally printed paper and polypropylene labels glued to the bottle with hot melt glue as exemplified EP 2349730 A (PLASTIPAK). This results not only in a large inventory of labels, but also in a more complicated manufacturing process.

More and more food and drink products are being packaged in plastic due to its lighter weight and convenience in comparison to glass. Legislation requires increasing amounts of packaging to be recycled and to minimize waste. In this perspective, the recycling of PET by flotation can be seen as one of the success stories.

Flotation is an efficient, density based sorting method used to separate light, floating components (such as caps and labels) from heavy, sunk components (such as grinded PET bottles). Non-PET components, like UV curable inks, that sink together with PET flakes cause serious processing inefficiencies which limit the use of recycled PET in applications such as bottles, film, sheet and fibre. Therefore combinations of PET with other material types that sink in water should be avoided.

WO 2012/003186 (PLASTIPAK) discloses a recyclable plastic article comprising an external surface with an image printed thereon, the image comprising cured droplets of ink, and the droplets of ink comprising a composition including a removal-promoting additive; wherein the removal-promoting additive causes the cured droplets of ink to separate or loosen from the external surface of the article when the image is exposed to a liquid-based solution. As removal-promoting additive, a hydrophilic monomer like methoxy polyethylene glycol monoacrylate is suggested.

However, WO 2012/003186 (PLASTIPAK) is silent on how a sink float separation can be accomplished.

WO 2012/028216 (KHS) discloses a method for digital printing on containers by generating a print layer forming a multi-colour printed image to an intermediate or base layer, which was applied on an outer surface of a container wall substrate wherein the bond strength or adhesion rates between the substrate and the intermediate or base layer are different from the adhesive strength or the adhesion rate between the base layer and the print layer, characterized in that the different adhesive strength or adhesion rates be adjusted by choice of materials and/or the crosslinking of the base layer and the print layer. Although no chemical details are given, it is suggested that to facilitate the separation of various materials during the recycling process, at least the printing inks used should have a density which is such smaller than the density of the material to be recycled.

SUMMARY OF THE INVENTION

Therefore, it would be desirable to have an industrial inkjet printing process wherein substrates can be directly printed avoiding e.g. labels, and can afterwards be de-inked and recycled by a sink float separation.

In order to overcome the problems described above, preferred embodiments of the present invention provide a free radical curable liquid as defined below.

It was surprisingly found, that the use of a specific free radical curable liquid composition allowed not only the production of a de-inkable substrate printed with radiation curable ink but also the recovery of the substrate by a sink float separation.

Further advantages and benefits of the invention will become apparent from the description hereinafter.

DETAILED DESCRIPTION OF THE PREFERRED EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —NO$_2$.

Free Radical Curable Liquids

The free radical curable liquid having a specific weight after curing measured at 25° C. of less than 1.00 g/cm$^3$ in a preferred embodiment of the present invention includes: a) one or more photoinitiators; b) one or more free radical polymerizable monomers or oligomers; and c) hollow particles and/or a free radical crosslinkable polymer selected from the group consisting of polyethylene, polypropylene, polybutadiene, polymethylpentene, poly(ethylene-vinylacetate), poly(ethylene-ethyl acrylate) and poly(styrene-butadiene) and copolymers thereof; wherein at least the free radical crosslinkable polymer or at least one of the one or more free radical polymerizable monomers or oligomers includes one or more hydrolyzable groups which upon hydrolyzation form an acid group or salt thereof; and wherein the free radical curable liquid contains no more than 10 wt % of organic solvent.

In a preferred embodiment of the free radical curable liquid, the one or more hydrolyzable groups form an acid group or salt thereof upon hydrolyzation in a 2% NaOH solution at 85° C., preferably within 30 minutes, more preferably within 15 minutes, and most preferably within 8 minutes. This can be verified, for example, by titration of the free radical crosslinkable polymer or the one or more free radical polymerizable monomers or oligomers at a temperature of 20° C. Alternatively, chemical analysis methods well-known to the skilled person can be performed such as e.g. GC-MS analysis, LC-MS analysis, H-NMR and C-NMR.

The free radical curable liquid is preferably used as a primer and can form a transparent, translucent or opaque cured layer on a substrate. Radiation curable inks, preferably radiation curable inkjet inks, can then be printed on the at least partially cured layer of the free radical curable liquid.

The free radical curable liquid can also be applied as a varnish layer, i.e. on top of a layer of radiation curable ink. A combination of both primer and varnish is also possible. In the latter, a "sandwich" layer assembly is formed consisting of: a primer layer of free radical curable liquid/one or more radiation curable ink layers/a varnish layer of free radical curable liquid.

In the disclosure here below, sometimes the term "primer" is used instead of free radical curable liquid. It should be clear that the primer and the free radical curable liquid are one and the same liquid. The usage of the term "primer" only underlines the preferred embodiment where the free radical curable liquid is applied to the substrate.

The hollow particles and/or a free radical crosslinkable polymer present in the free radical curable liquid allow setting a specific weight after curing measured at 25° C. of the at least partially cured layer of the free radical curable liquid to a value of less than 1.00 g/cm$^3$. By having a specific weight after curing measured at 25° C. of less than 1.00 g/cm$^3$, the cured layer of the free radical curable liquid floats on water or an alkaline aqueous solution.

The specific weight after curing measured at 25° C. of the at least partially cured layer of the free radical curable liquid is preferably less than 0.95 g/cm$^3$, more preferably less than 0.90 g/cm$^3$, and most preferably less than 0.85 g/cm$^3$.

By printing radiation curable inks on the at least partially cured layer of the free radical curable liquid, a layer assembly is formed consisting of a cured layer of the free radical curable liquid, one or more layers of radiation curable ink, optionally covered by a colourless ink or varnish. If necessary for flotation of the layer assembly, the skilled person can easily adjust the thickness of the at least partially cured layer of the free radical curable liquid and/or increase the concentration of hollow particles and/or free radical crosslinkable polymer in the free radical curable liquid, so that the layer assembly has a specific weight after curing measured at 25° C. of less than 1.00 g/cm$^3$.

The terms "partial cure" and "full cure" refer to the degree of curing, i.e, the percentage of converted functional groups, and may be determined by for example RT-FTIR (Real-Time Fourier Transform Infra-Red Spectroscopy) a method well known to the one skilled in the art of curable formulations. A partial cure, also called a pin cure, is defined as a degree of curing wherein at least 5%, preferably at least 10%, of the functional groups in the coated formulation is converted. A full cure is defined as a degree of curing wherein the increase in the percentage of converted functional groups, with increased exposure to radiation (time and/or dose), is negligible. A full cure corresponds with a conversion percentage that is within 10%, preferably within 5%, from the maximum conversion percentage defined by the horizontal asymptote in the RT-FTIR graph (percentage conversion versus curing energy or curing time).

The viscosity can be particularly well controlled by the hollow particles and the free radical crosslinkable polymer. For a very low viscous free radical curable liquid, a large amount of hollow particles is used while no or only a minor amount of the free radical crosslinkable polymer is used. For higher viscosity of the free radical curable liquid, the hollow particles can be partially or fully replaced by the free radical crosslinkable polymer. The viscosity can also be further controlled by a proper selection of the one or more free radical polymerizable monomers or oligomers and their concentration in the free radical curable liquid.

The presence of free radical polymerizable monomers or oligomers in the free radical curable liquid ensures a good adhesion with the free radical curable inks applied or jetted on an at least partially cured primer layer of the free radical curable liquid. As a result, the adhesion between primer and ink is superior to the adhesion between the substrate and the free radical curable primer. This results in easy removal of the primer layer and inks as a single entity, i.e. as a primer and ink layer assembly.

In addition, the presence of free radical polymerizable monomers or oligomers in the free radical curable liquid was found to facilitate the incorporation of photoinitiator into the free radical curable liquid. A free radical curable liquid lacking free radical polymerizable monomers or oligomers did not allow a stable incorporation of photoinitiator. Either it was not possible to incorporate the photoinitiator at all, or if it could be mixed into the free radical curable liquid then phase separation was observed.

The free radical polymerizable monomers or oligomers in the free radical curable liquid preferably include at least one free radical polymerizable group selected from the group consisting of an acrylate group, a methacrylate group, an acrylamide group, a methacrylamide group, a styrene group, a maleate group, a fumarate group, an itaconate group, a vinyl ether group, a vinyl ester group, an allyl ether group and an allyl ester group.

In a more preferred embodiment, the free radical curable liquid includes at least one free radical polymerizable group selected from the group consisting of an acrylate group, a methacrylate group and a vinyl ether group.

In a preferred embodiment, the free radical curable liquid includes a colorant, preferably a white pigment, more preferably an inorganic pigment with a refractive index greater than 1.60. The advantage of adding the white pigment to the free radical curable primer is that a thinner layer of free radical curable primer can be applied to the substrate compared to the situation where a white radiation curable inkjet ink would be jetted on the substrate for creating a white background while maintaining good recyclability of the substrate.

In a preferred embodiment, the free radical curable liquid is applied at a dry thickness between 5 and 50 μm, more preferably a dry thickness between 10 and 30 μm.

The surface area of the at least partially cured layer of free radical curable liquid is preferably equal to larger than that of the one or more radiation curable (inkjet) inks printed on the substrate.

In a preferred embodiment, the free radical curable liquid contains 1 to 20 wt % of one or more photoinitiators; 10 to 40 wt % of one or more free radical polymerizable monomers or oligomers; 0 to 40 wt % of hollow particles and/or 0 to 90 wt % of a free radical crosslinkable polymer selected from the group consisting of polyethylene, polypropylene, polybutadiene, polymethylpentene, poly(ethylene-vinylacetate), poly(ethylene-ethyl acrylate) and poly(styrene-butadiene) and copolymers thereof, wherein all the wt % are based on the total weight of the free radical curable liquid.

Radiation Curable Inks

The radiation curable inks used in an embodiment of the present invention are preferably free radical curable (inkjet) inks.

In addition to the good adhesion between a free radical curable ink and an at least partially cured layer of free radical curable liquid, it was found in industrial inkjet printing systems that cationically curable inkjet inks posed problems of jetting reliability due to UV stray light. The UV-curing of ink on a three dimensional object like a PET bottle causes multiple reflections of UV light, including UV light hitting the nozzle plate of an inkjet print head and resulting into failing nozzles due to clogging by cured ink in the nozzle. Unlike free radical ink where radical species have a much shorter lifetime, the cationic curable ink continues to cure once an acid species has been generated by UV light in the nozzle.

The radiation curable inkjet ink is preferably part of a radiation curable inkjet ink set. Such a curable ink set preferably includes at least one yellow curable ink (Y), at least one cyan curable ink (C) and at least one magenta curable ink (M) and preferably also at least one black curable ink (K). The curable CMYK-ink set may also be extended with extra inks such as red, green, blue, and/or orange to further enlarge the colour gamut. The CMYK ink set may also be extended by the combination of the full density inkjet inks with light density inkjet inks. The combination of dark and light colour inks and/or black and grey inks improves the image quality by a lowered graininess.

In one embodiment, a free radical curable inkjet ink is used which includes a white pigment, more preferably an inorganic pigment with a refractive index greater than 1.60.

The advantage of adding the white pigment to a radiation curable inkjet ink is that more vibrant colour images can be obtained. By using a white radiation curable inkjet ink instead of a white free radical curable liquid primer, the white background can be applied image-wise in a high resolution. The white radiation curable inkjet ink can be applied on an at least partially cured primer layer or on the colour radiation curable inkjet inks. In the latter case, the colour image is viewed through a transparent primer layer and polymeric film, e.g. a transparent PET film.

The colorant in the radiation curable ink can be a dye but is preferably a pigment. The pigmented radiation curable ink preferably contains a dispersant, more preferably a polymeric dispersant, for dispersing the pigment. The pigmented curable ink may contain a dispersion synergist to improve the dispersion quality and stability of the ink.

The advantage of using pigments instead of dyes is that recycling problems are reduced, e.g. dyes tend to stick more to paper fibres resulting in a lower quality of recycled paper. If the substrate is used as packaging material for food stuffs, then pigments usually pose no migration problems, contrary to dyes which may migrate into the food resulting in issues of food safety or organoleptic nature.

In a preferred embodiment, the radiation curable inkjet ink includes one or more initiators selected from the group consisting of non-polymeric di- or multifunctional initiators, oligomeric initiators, polymeric initiators and polymerizable initiators; wherein the polymerizable composition of the radiation curable inkjet ink consists essentially of:

a) 25-100 wt % of one or more polymerizable compounds A having at least one acrylate group and at least one vinylether group;

b) 0-55 wt % of one or more polymerizable compounds B selected from the group consisting of monofunctional acrylates and difunctional acrylates; and c) 0-55 wt % of one or more polymerizable compounds C selected from the group consisting of trifunctional acrylates, tetrafunctional acrylates, pentafunctional acrylates and hexafunctional acrylates, with the proviso that if the weight percentage of compounds B>24 wt %, then the weight percentage of compounds C>1 wt %; and wherein all weight percentages of A, B and C are based upon the total weight of the polymerizable composition.

The static surface tension of the inkjet ink is preferably from 20 to 40 mN/m, more preferably from 22 to 35 mN/m. It is preferably 20 mN/m or more from the viewpoint of printability by a second radiation curable inkjet ink, and it is preferably not more than 30 mN/m from the viewpoint of the wettability.

The inkjet ink preferably also contains at least one surfactant so that the dynamic surface tension is no more than 30 mN/m measured by maximum bubble pressure tensiometry at a surface age of 50 ms and at 25° C.

For having a good ejecting ability and fast inkjet printing, the viscosity of the inkjet ink at the temperature of 45° C. is preferably smaller than 30 mPa·s, more preferably smaller than 15 mPa·s, and most preferably between 1 and 10 mPa·s all at a shear rate of 1,000 s$^{-1}$. A preferred jetting temperature is between 10 and 70° C., more preferably between 25 and 50° C., and most preferably between 35 and 45° C.

Photoinitiators

The radiation curable inkjet ink preferably also contains an initiator. The initiator typically initiates the polymerization reaction. The initiator can be a thermal initiator, but is preferably a photoinitiator. The photoinitiator requires less energy to activate than the monomers, oligomers and/or prepolymers to form a polymer. If the free radical inkjet ink contains no initiator it can be cured by electron beam curing.

The photoinitiator in the curable inkjet ink or free radical curable liquid is a free radical initiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For a low migration radiation curable inkjet ink or free radical curable liquid, the photoinitiator is preferably a so-called diffusion hindered photoinitiator. A diffusion hindered photoinitiator is a photoinitiator which exhibits a much lower mobility in a cured layer of the ink or free radical curable liquid than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator or a polymeric photoinitiator.

A preferred diffusion hindered photoinitiator contains one or more photoinitiating functional groups derived from a Norrish type I-photoinitiator selected from the group consisting of benzoinethers, benzil ketals, $\alpha,\alpha$-dialkoxyacetophenones, $\alpha$-hydroxyalkylphenones, $\alpha$-aminoalkylphenones, acylphosphine oxides, acylphosphine sulphides, $\alpha$-haloketones, $\alpha$-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2161264 A (AGFA). A preferred amount of photoinitiator is 0-50 wt %, more preferably 0.1-20 wt %, and most preferably 0.3-15 wt % of the total weight of the radiation curable ink or free radical curable liquid.

In a very preferred embodiment, the radiation curable inkjet ink includes a polymerizable or polymeric thioxanthone photoinitiator and an acylphosphine oxide-based polymerization photoinitiator, more preferably a bis(2,4,6-trimethylbenzoyl)-phenylphosphineoxide photoinitiator.

Photoinitiators like bis(2,4,6-trimethylbenzoyl)-phenylphosphineoxide photoinitiator are monofunctional but are allowed by the Swiss ordinance SR 817.023.21 on Objects and Materials due to their very low toxicity level.

In order to increase the photosensitivity further, the radiation curable ink or free radical curable liquid may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino)benzoate, 2-(dimethylamino)ethylbenzoate, ethyl-4-(dimethylamino) benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate). The preferred co-initiators are aminobenzoates.

When one or more co-initiators are included into the radiation curable inkjet ink or free radical curable liquid, preferably these co-initiators are diffusion hindered for safety reasons.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth) acrylate group, more preferably having at least one acrylate group.

Some co-initiators, like ethylhexyl-4-dimethylaminobenzoate, are not diffusion hindered co-initiators but are allowed by the Swiss ordinance SR 817.023.21 on Objects and Materials due to their very low toxicity level. In a preferred embodiment, the radiation curable inkjet ink includes ethylhexyl-4-dimethylaminobenzoate as co-initiator.

The radiation curable inkjet ink preferably includes a polymerizable or polymeric tertiary amine co-initiator.

Preferred diffusion hindered co-initiators are the polymerizable co-initiators disclosed in EP 2053101 A (AGFA) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 A (AGFA).

The radiation curable inkjet ink or free radical curable liquid preferably includes the (diffusion hindered) co-initiator in an amount of 0.1 to 50 wt %, more preferably in an amount of 0.5 to 25 wt %, most preferably in an amount of 1 to 15 wt % of the total weight of the inkjet ink or free radical curable liquid.

Free Radical Polymerizable Monomers and Oligomers

The same or different free radical polymerizable monomers or oligomers may be used in the free radical curable liquid and inkjet inks.

A combination of monomers, oligomers and/or prepolymers may also be used and they may possess different degrees of functionality. A mixture including combinations of mono-, di-, tri- and higher functionality monomers, oligomers and/or prepolymers may be used. The viscosity of the inkjet ink and free radical curable liquid can be adjusted by varying the ratio between the monomers and oligomers. Particularly preferred monomers and oligomers are those listed in [0106] to [0115] of EP 1911814 A (AGFA).

For achieving high printing speeds, low viscous monomers are used so that a low viscosity for the radiation curable inkjet ink and free radical curable liquid can be obtained. A popular low viscosity monomer is tetrahydrofurfuryl (meth)acrylate. However, in industrial inkjet printing also a high reliability is required which allows the incorporation of the inkjet printing system into a production line.

The radiation curable free radical curable liquid and/or inkjet ink preferably include a vinylether (meth)acrylate monomer. Vinylether acrylate monomers allow preparing radiation curable compositions of extremely low viscosity.

The vinylether (meth)acrylate monomer is preferably a monomer represented by Formula (I):

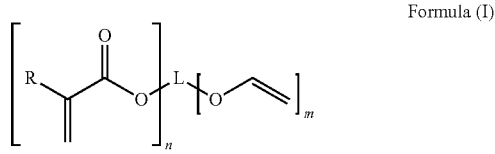

Formula (I)

wherein,
R represents hydrogen or a methyl group;
L represents a linking group comprising at least one carbon atom; and
n and m independently represent a value from 1 to 5.

The radiation curable free radical curable liquid and/or inkjet ink preferably includes 2-(2-vinyloxyethoxy)ethyl acrylate as vinylether (meth)acrylate monomer.

In a preferred embodiment, the vinylether (meth)acrylate monomer is present in the free radical curable liquid and/or inkjet ink in an amount of 20 wt % to 90 wt %, more preferably 25 wt % to 80 wt % and most preferably 30 wt % to 70 wt %, all based upon the total weight of the free radical curable liquid or inkjet ink.

It was found that a vessel of tetrahydrofurfuryl acrylate kept at 40° C. for 100 hours lost 40% of its weight. Printing heads in the present method preferably operate at temperatures between 35 to 45° C. A high evaporation of tetrahydrofurfuryl (meth)acrylate from a print head nozzle during a stand-by mode from the inkjet printer leads to an unacceptable increase in viscosity of the inkjet ink in the print head and subsequently to jetting failures of the print head (bad latency). The free radical curable liquid and radiation curable inkjet inks preferably use low viscosity monomers exhibiting small evaporation rates such as vinyl ether(meth)acrylates. For example, 2-(2-vinyloxyethoxy)ethyl acrylate (VEEA) kept at 40° C. for 100 hours loses only 8% of its weight.

In a preferred embodiment, the monomers in the radiation curable inkjet ink which have a viscosity of less than 15 mPa·s at 45° C. and at a shear rate of 1,000 s$^{-1}$, lose less than 15% of their weight when kept at 40° C. for 100 hours in an open cubic vessel.

Another advantage of VEEA is that it is a bifunctional monomer having two different polymerizable groups, namely an acrylate group and an ether group. This allows a better control of the polymerization rate, whereby the amount of extractable and migrateable monomer is reduced. This reduces health risks to inkjet printer operators or allows for printing e.g. food packaging materials that are subject to strict safety regulations.

In a preferred embodiment, the radiation curable inkjet ink or free radical curable liquid includes a monomer or oligomer including at least one acrylate group and at least one ethylenically unsaturated polymerizable group selected from the group consisting of allylether group, allylester group, allylcarbonate group, vinyl ether group, vinylester group, vinylcarbonate group, fumarate group, and maleate group. Preferred examples of monomers and oligomers are disclosed in EP 2053101 A (AGFA).

In a preferred embodiment, the polymerizable composition of the radiation curable inkjet ink consists essentially of: a) 25-100 wt % of one or more polymerizable compounds A having at least one acrylate group and at least one second ethylenically unsaturated polymerizable functional group selected from the group consisting of a vinyl ether group, an allylether group and an allylester group; b) 0-55 wt % of one or more polymerizable compounds B selected from the group consisting of monofunctional acrylates and difunctional acrylates; and c) 0-55 wt % of one or more polymerizable compounds C selected from the group consisting of trifunctional acrylates, tetrafunctional acrylates, pentafunctional acrylates and hexafunctional acrylates, with the proviso that if the weight percentage of compounds B>24 wt %, then the weight percentage of compounds C>1 wt %; and wherein all weight percentages of A, B and C are based upon the total weight of the polymerizable composition; and with the proviso that at least one polymerizable compound B or C is present in the polymerizable composition if the free radical curable inkjet ink contains no initiator. Such a composition allows for safe inkjet printing on food packaging materials.

The monomers and oligomers used in radiation curable inkjet inks and free radical curable liquid are preferably purified compounds having no or almost no impurities, more particularly no carcinogenic, mutagenic or reprotoxic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

The radiation curable inkjet ink preferably includes 60 to 95 wt % of polymerizable compounds, more preferably 70 to 90 wt % of polymerizable compounds based upon the total weight of the radiation curable inkjet ink. A varnish may include up to 99 wt % of polymerizable compounds based upon the total weight of the radiation curable varnish.

In a preferred embodiment, the free radical curable liquid includes one or more free radical polymerizable monomers or oligomers including a hydrolyzable group which upon hydrolyzation forms an acid group or salt thereof. By including a hydrolyzable group rather than an acid group or salt thereof in the chemical structure of the one or more free radical polymerizable monomers or oligomers, it is possible to control the adhesion of an at least partially cured layer of the free radical curable liquid to the substrate. By using a hydrolyzable group, the at least partially cured layer of the free radical curable liquid adheres well to the substrate, while in the recycling process the alkaline aqueous solution, e.g. a 2% NaOH solution generally used in the recycling process of PET, hydrolyzes the hydrolyzable group which readily results in a detachment of the cured layer from the substrate. In such a free radical curable liquid, it becomes no longer necessary to include hydrolyzable groups in the free radical crosslinkable polymer.

In a preferred embodiment, the free radical polymerizable monomer or oligomer includes as hydrolyzable group which upon hydrolyzation form an acid group or salt thereof an oxalate group or a cyclic anhydride group. These hydrolyzable groups allow fast hydrolyzation in contrast to e.g. an ester group, such as a (meth)acrylate group. Fast hydrolyzation means that an acid group or salt is formed within 30 minutes, more preferably within 15 minutes, and most preferably within 8 minutes in a 2% NaOH solution at 85° C.

In a preferred embodiment, the free radical polymerizable monomer or oligomer includes as an oxalate group as the hydrolyzable group which upon hydrolyzation form an acid group or salt thereof.

In a preferred embodiment, the free radical polymerizable monomer or oligomer including a hydrolyzable group which upon hydrolyzation forms an acid group or salt is preferably an (meth)acrylate, more preferably an acrylate.

Preferred oxalate monomers are shown in Table 1, without being limited thereto.

TABLE 1

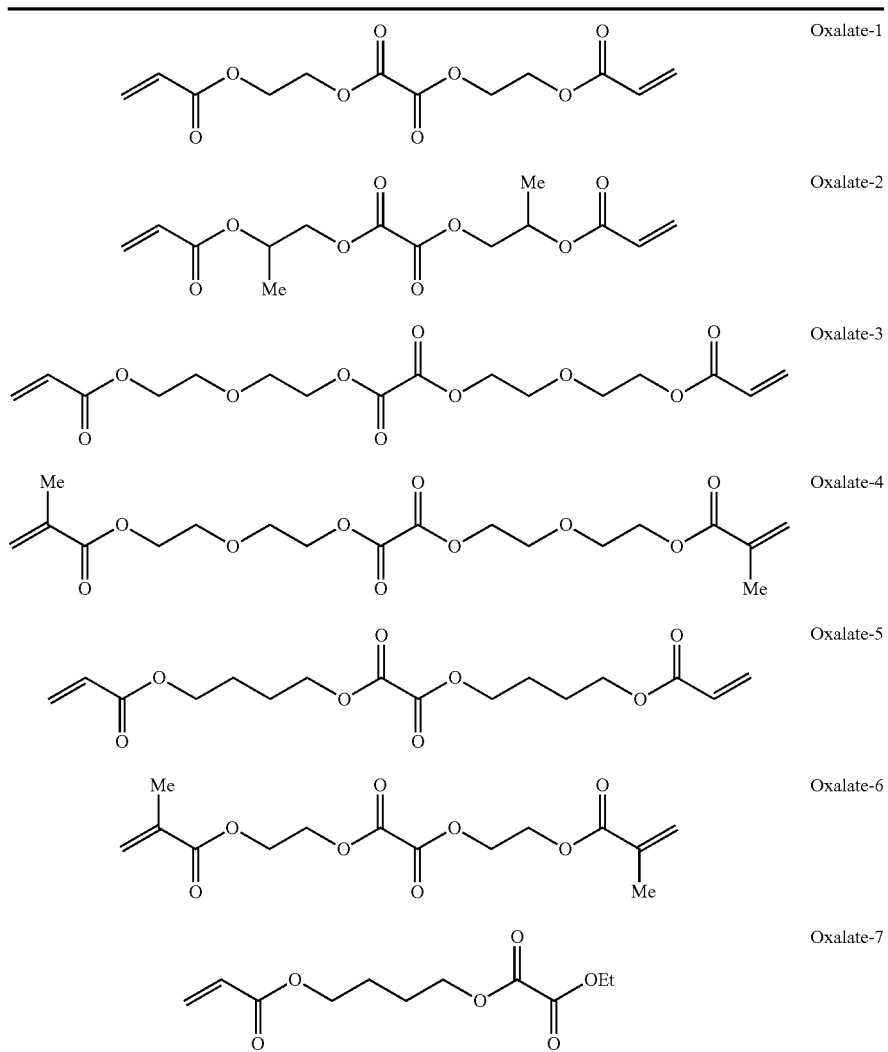

TABLE 1-continued

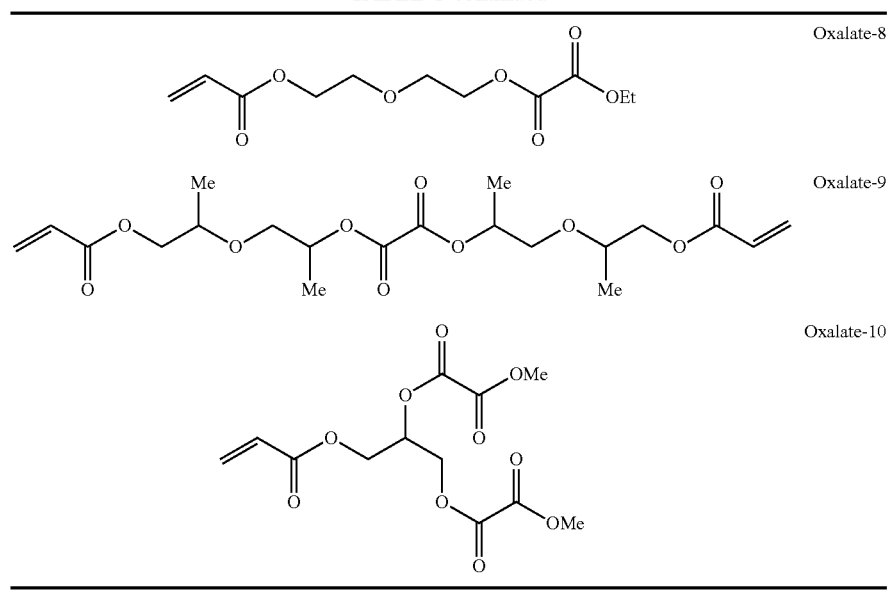

Free Radical Crosslinkable Polymers

The free radical curable liquid preferably includes a free radical crosslinkable polymer selected from the group consisting of polyethylene, polypropylene, polybutadiene, polymethylpentene, poly(ethylene-vinylacetate), poly(ethylene-ethyl acrylate) and poly(styrene-butadiene) and copolymers thereof.

In a more preferred embodiment, the free radical crosslinkable polymer includes hydrolyzable groups which upon hydrolyzation form an acid group or salt thereof, such as a carboxylic acid group or salt thereof. If recycling of the printed substrate is performed by sink float separation using an aqueous caustic solution, then the hydrolyzation results in an accelerated removal of the primer and ink layer assembly from the substrate. An improved flotation may also be observed due to an effect similar to that observed in dispersing pigment based on electrostatic forces. The cation in the salt of the acid group formed upon hydrolyzation usually comes from the aqueous caustic solution. For example, if a 2% NaOH solution is used, then the salt of the acid group will be a sodium salt. There is no real limitation on the nature of the cation in the salt of the acid group formed upon hydrolyzation. Generally for economical reasons, a caustic solution of NaOH or KOH will be used in the recycling process so that sodium or potassium salt of the acid group is obtained.

In a preferred embodiment of the present invention, the cation in the salt of the acid group is a monovalent cation preferably selected from the group consisting of $Na^+$, $K^+$, $Li^+$ and $NH_4^+$.

In a very preferred embodiment, the free radical crosslinkable polymer is a maleinised polybutadiene. Preferred commercial examples of a maleinised polybutadiene include Lithene™ N4 5000 15MA, Lithene™ N4 B 10 MA and Lithene™ PM 4 7.5MA from SYNTHOMER. The maleinised polybutadiene preferably has an average molecular weight Mn smaller than 10,000 and preferably includes 5 to 20 wt % of maleic anhydride units based on the weight of the maleinised polybutadiene. During the recycling process with an alkaline aqueous solution, the maleic anhydride groups are hydrolyzed to maleic acid groups or salts thereof.

Another preferred free radical crosslinkable polymer having hydrolyzable groups which upon hydrolyzation form acid groups or salts thereof are free radical crosslinkable polyolefins having hydrolyzable silane groups such as those disclosed by WO 2010/130458 A (BOREALIS).

If no hollow particles are present in the free radical curable primer, then the free radical crosslinkable polymer is preferably present in amount of at least 50 wt %, more preferably at least 60 wt % and most preferably at least 70 wt % based on the total weight of the free radical curable primer.

The free radical crosslinkable polymer preferably has an average molecular weight Mn of no more than 10,000.

Hollow Particles

Hollow particles have a core-shell structure, wherein the shell is polymeric, ceramic or metallic and the core is filled with a gas, often air.

Preferred hollow particles are so-called cenospheres. A cenosphere is a light weight, inert, hollow sphere made largely of silica and/or alumina and filled with air or inert gas. The density of cenospheres varies from about 0.4 to 0.8 $g/cm^3$, which gives them a great buoyancy.

In a preferred embodiment, the hollow particle is a glass microsphere, often also called "glass bubbles. Preferred commercial glass bubbles include XLD6000, XLD3000, iM30K, K42HS, S42XHS, IM30K grades of 3M glass bubbles, which have a density between 0.2 and 0.6 $g/cm^3$ and an average particles size of 30 μm or less. Glass is a relative cheap yet very strong material. For example, 90% of the XLD6000 glass bubbles survive a crush strength test at 6,000 psi.

Glass bubbles are preferred over polymeric hollow particles not only for their greater strength but also for their impermeability to solvents or some polymerizable compounds like acrylates which can strongly decrease their buoyancy.

Metallic hollow particles, preferably aluminium hollow particles, are normally also impermeable and relatively strong. In preferred embodiment, they are used in a free radical curable primer for giving a metallic background colour. Metallic hollow particles can be advantageously used for the recyclability of printed matter in e.g. a luxury packaging, where otherwise solid metallic pigments would be used for the metallic background. The method for preparing hollow metal particles is well-known to the skilled person. For example, U.S. Pat. No. 5,024,695 (ULTRAFINE POWDER TECHNOLOGY) discloses a method for preparing metallic hollow particles with a mean diameter of approximately 10 micron.

In a preferred embodiment, the hollow particles have a maximum particle size no greater than the thickness of the cured primer layer. If the thickness of the cured primer layer is smaller than the maximum particle size of the hollow particles, an inferior image quality of the digitally printed image tends to be observed. For improving image quality the glass bubbles are preferably filtered in liquid condition through a 20 μm, more preferably through a 10 μm filter. Very small glass bubbles tend to have a small ratio of gas to glass, and consequently a reduced buoyancy. For improving the buoyancy, these small glass bubbles can be removed, for example, by sink float separation in an organic solvent like e.g. methanol. The small glass bubbles having a density of 0.8 g/m$^3$ can be effectively removed as they sink to the bottom of the methanol vessel. After removing the solvent by filtration or evaporation, incorporation of the glass bubbles in a free radical curable liquid results in an improved buoyancy of the cured layer thereof.

In one embodiment, the hollow particles are added to the free radical curable liquid having a specific weight after curing of less than 1.00 g/cm$^3$ at 25° C. including one or more photoinitiators; and one or more free radical polymerizable monomers or oligomers, but lacking the free radical crosslinkable polymer. In this embodiment, the hollow particles are preferably present in an amount of 10 to 50 wt %, more preferably 10 to 40 wt %, most preferably 15 to 30 wt % based on the total weight of the free radical curable primer.

In another embodiment, the hollow particles can be added, even in a small concentration, to the free radical curable liquid having a specific weight after curing measured at 25° C. of less than 1.00 g/cm$^3$ including one or more photoinitiators; one or more free radical polymerizable monomers or oligomers, and the free radical crosslinkable polymer. In this embodiment, the hollow particles are preferably present in an amount of 1 to 40 wt %, more preferably 5 to 30 wt %, most preferably 10 to 20 wt % based on the total weight of the free radical curable liquid.

Inkjet Printing Methods

A preferred embodiment of the present invention is achieved by an inkjet printing method including the steps of:
a) applying a layer of free radical curable liquid in accordance with the present invention to a substrate;
b) at least partially curing the applied layer of free radical curable liquid;
c) jetting one or more free radical curable inkjet inks on the at least partially cured layer of free radical curable liquid; and
d) curing the one or more jetted free radical curable inkjet inks.

The free radical curable liquid can be applied to the substrate by any suitable coating method, such as knife coating and curtain coating or by printing methods like flexography or valve jet printing.

In a preferred embodiment, a valve jet printing method is used to apply the free radical curable liquid. The size of hollow particles exhibiting good buoyancy, such as the above mentioned glass bubbles, is usually to large for conventional inkjet print heads, however such free radical curable liquids can be applied according to a pattern or an image by valve jet.

Suitable valve jet print heads are the ChromoJet™ print heads available from J. Zimmer Maschinenbau GmbH (Austria).

The free radical curable liquid is generally a liquid requiring partial curing for immobilizing it on the substrate. By only partially curing, an improved adhesion between liquid and inkjet ink can often be observed compared to a fully cured liquid. This results in a layer assembly of primer and ink swimming of as a whole which facilitates the recycling through flotation.

Different types of layer assemblies may be used on the substrate.

In one preferred embodiment, the layer assembly consists of a transparent primer layer, one or more layers of colour inkjet ink, optionally covered by a colourless inkjet ink or varnish.

In another preferred embodiment, the layer assembly consists of a transparent primer layer, a white inkjet ink layer, one or more layers of colour inkjet ink, optionally covered by a colourless inkjet ink or varnish.

In yet another preferred embodiment, the layer assembly consists of a translucent or opaque primer layer, one or more layers of colour inkjet ink, optionally covered by a colourless inkjet ink or varnish.

In yet another preferred embodiment, the layer assembly consists of a translucent or opaque primer layer, a white inkjet ink layer, one or more layers of colour inkjet ink, optionally covered by a colourless inkjet ink or varnish.

In yet another embodiment, the layer assembly consists of a transparent primer layer, one or more layers of colour inkjet ink, and a layer of white inkjet ink. In this case, the layer assembly is viewed though a transparent substrate.

The free radical curable liquid can be used on substrates not intended to be recycled, but preferably a cured layer assembly of the free radical curable liquid and one or more radiation curable inkjet inks has a density less than 1.00 g/cm$^3$, so that it can be recycled through flotation. In the latter case of recycling, the density of the substrate is preferably larger than 1.10 g/cm$^3$.

Especially if the substrate is paper or textile, the inkjet inks preferably lack a dye soluble in an aqueous alkaline solution. Since this may result in undesired colouring of e.g. the paper pulp, similar to the situation where a single red sock turns a whole wash load pink.

Colorants

The free radical curable liquid and the radiation curable (inkjet) ink can be a clear radiation curable (inkjet) ink, i.e. a varnish, but preferably at least the radiation curable (inkjet) ink includes at least one colorant, which may be a dye but is most preferably a pigment. All colorants mentioned here below for the radiation curable (inkjet) ink may also be used in the free radical curable liquid.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

Preferred pigments are disclosed in paragraphs [0128] to [0138] of WO 2008/074548 (AGFA).

Preferred pigments include as red or magenta pigments, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36, as blue or cyanogen pigments, Pigment Blue 1, 15, 15:1, 15:2, 15:3, 15:4, 15:6, 16, 17-1, 22, 27, 28, 29, 36, 60, as green pigments, Pigment Green 7, 26, 36, 50, as yellow pigments, Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, 193, as black pigments, Pigment Black 7, 28, 26, as white pigments, Pigment White 6, 18 and 21.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the radiation curable inkjet ink includes a black pigment and at least one pigment selected from the group consisting of a blue pigment, a cyan pigment, magenta pigment and a red pigment. It was found that such a black inkjet ink was better readable and scannable on a transparent substrate.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.200 μm. An average particle size smaller than 0.050 μm is less desirable for decreased fastness, but mainly also because very small pigment particles or individual pigment molecules thereof may still migrate into the food packaging applications. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function However for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA). The white pigment is preferably a pigment with a refractive index greater than 1.60. The white pigments may be employed singly or in combination. Preferably titanium dioxide is used as pigment with a refractive index greater than 1.60. Preferred titanium dioxide pigments are those disclosed in [0117] and in [0118] of WO 2008/074548 (AGFA).

The pigments are preferably present in the range of 0.01 to 15%, more preferably in the range of 0.05 to 10% by weight and most preferably in the range of 0.1 to 8% by weight, each based on the total weight of the pigment dispersion. For white pigment dispersions, the white pigment is preferably present in an amount of 3% to 40% by weight of the pigment dispersion, and more preferably 5% to 35%. An amount of less than 3% by weight cannot achieve sufficient covering power and usually exhibits very poor storage stability and ejection property.

Polymeric Dispersants

The pigmented radiation curable inkjet ink and pigmented free radical curable liquid preferably contains a dispersant, more preferably a polymeric dispersant, for dispersing the pigment. The pigmented radiation curable inkjet ink may contain a dispersion synergist to improve the dispersion quality and stability of the ink.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA).

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:
- DISPERBYK™ dispersants available from BYK CHEMIE GMBH;
- SOLSPERSE™ dispersants available from NOVEON;
- TEGO™ DISPERS™ dispersants from EVONIK;
- EDAPLAN™ dispersants from MÜNZING CHEMIE;
- ETHACRYL™ dispersants from LYONDELL;
- GANEX™ dispersants from ISP;
- DISPEX™ and EFKA™ dispersants from CIBA SPECIALTY CHEMICALS INC;
- DISPONER™ dispersants from DEUCHEM; and
- JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON. The polymeric dispersant is preferably used in an amount of 2 to 600 wt %, more preferably 5 to 200 wt %, most preferably 50 to 90 wt % based on the weight of the pigment.

Polymerization Inhibitors

The free radical curable liquid and (inkjet) inks may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total weight of the free radical curable liquid or (inkjet) ink.

Surfactants

The free radical curable liquids and radiation curable (inkjet) inks may contain at least one surfactant. The surfactant can be anionic, cationic, non-ionic, or zwitter-ionic and is usually added in a total quantity less than 3 wt % based on the total weight of the ink and particularly in a total less than 1 wt % based on the total weight of the free radical curable liquid or (inkjet) ink.

Suitable surfactants include fluorinated surfactants, fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and silicone surfactants.

The silicone surfactants are preferably siloxanes and can be alkoxylated, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Solvents

The free radical curable liquid and the radiation curable inkjet ink preferably do not contain an evaporable component such as an organic solvent. But sometimes it can be advantageous to incorporate a small amount of an organic solvent to improve adhesion to the surface of a substrate after UV-curing. In this case, the added solvent can be any amount in the range that does not cause problems of solvent resistance and VOC, and preferably amounts to 0.1-10.0 wt %, and particularly preferably 0.1-5.0 wt %, both based on the total weight of the free radical curable liquid or radiation curable inkjet ink. Large amounts of organic solvents may cause failing inkjet nozzles due to evaporation of the organic solvent at the nozzle orifice when the inkjet printer is in a stand-by mode. In an industrial environment, printing interruptions due to failing nozzles should be minimized.

In a preferred embodiment, the free radical curable liquid contains no more than 10 wt % of organic solvent, more preferably the free radical curable liquid contains no organic solvent.

Preparation of Inkjet Inks

The preparation of pigmented radiation curable inkjet inks is well-known to the skilled person. Preferred methods of preparation are disclosed in paragraphs [0076] to [0085] of WO 2011/069943 A (AGFA).

Substrates

The assembly of the free radical curable liquid and one or more radiation curable (inkjet) inks is essentially a very thin layer of plastic on the surface of the substrate, which in the past was found to be difficult to "break" into small pieces. This allowed only "downcycling", e.g. the recycling of printed matter on paper to a lower grade paper such as board for folding boxes, corrugated containers or cellulose insulation. If the paper were to be "upcycled", for example to an equal or better grade of paper, then additional pulp cleaning and flotation was required. The assembly of free radical curable liquid and inkjet inks in accordance with the present invention can be easily broken into smaller pieces and makes paper recycling through flotation possible.

For allowing efficient recycling through flotation, the density of the substrate is preferably larger than 1.10 g/cm$^3$, more preferably larger than 1.20 g/cm$^3$.

Preferred substrates having a density larger than 1.10 g/cm$^3$ include polycarbonate, polyvinyl chloride (PVC), polyesters like polyethylene terephthalate (PET), polyethylene naphthalate (PEN) and polylactide (PLA) and polyimides.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

The assembly of the free radical curable primer and one or more radiation curable inkjet inks may also be used on non-polymeric substrates like glass and metal substrates having a density larger than 1.10 g/cm$^3$.

There is no restriction on the shape of the substrate. It can be a flat sheet, such a paper sheet or a polymeric film or it can be a three dimensional object like e.g. a plastic coffee cup. If foodstuffs or pharmaceuticals are to be included as content of the three dimensional object, than preferably diffusion hindered photoinitiators and purified monomers and oligomers are used. In a preferred embodiment, the one or more free radical curable inkjet inks include a polymeric or polymerizable photoinitiator.

The three dimensional object can also be a container like a bottle or a jerry-can for including e.g. oil, shampoo, insecticides, pesticides, solvents, paint thinner or other type of liquids.

Inkjet Printing Devices

The radiation curable inkjet inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to a preferred embodiment of the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Curing Devices

The radiation curable liquids and inkjet inks according to a preferred embodiment of the present invention can be cured by exposing them to actinic radiation, preferably by ultraviolet radiation.

In inkjet printing, the curing device may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head, such as LED. Therefore, a static fixed radiation source may be employed, e.g. a source of curing UV-light, connected to the radiation source by a flexible radiation conductive device such as a fiber optic bundle or an internally reflective flexible tube.

Alternatively, the actinic radiation may be supplied from a fixed source to the radiation head by an arrangement of mirrors including a mirror upon the radiation head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as Sigma-Aldrich (Belgium) and Acros (Belgium) unless otherwise specified.

TR52 is TIOXIDE TR 52™, a surface modified titanium dioxide from HUNTSMAN CHEMICAL GROUP.

Heliogen™ Blue D 7110 F is a C.I. Pigment Blue 15:4 pigment from CIBA-GEIGY.

Hostaperm™ Blue P-BFS is a cyan pigment (C.I. Pigment Blue 15:4) available from CLARIANT.

Macrolex™ Blue 3R is a blue anthraquinone dye from LANXESS.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed.

EFKA™7701 is a butylacrylate-vinylpyridine copolymer having an amine value of 40 mg KOH/g available from BASF.

Lithene™ PM 4 is a low viscosity (0.8 Pa·s at 25° C.), low molecular weight (Mn=1500), liquid polybutadiene available from SYNTHOMER.

Lithene™ AL is a low viscosity (3 Pa·s at 25° C.), low molecular weight (Mn=1000), liquid polybutadiene available from SYNTHOMER.

Lithene PM4-7.5MA is a medium viscosity (20-60 Pa·s at 25° C.), low molecular weight (Mn=1,600), liquid polybutadiene available from SYNTHOMER. It is based on Lithene PM4 adducted with 7.5 parts maleic anhydride.

Lithene™ N4 B 10MA is a medium viscosity (60-90 Pa·s at 25° C.), low molecular weight (Mn=8200), liquid polybutadiene adducted with 10 parts maleic anhydride available from SYNTHOMER.

Lithene N4-5000-15MA is a medium viscosity (120-220 Pa·s at 25° C.), narrow molecular weight (Mn=5750), liquid polybutadiene available from SYNTHOMER. It is based on Lithene N4-5000 and adducted with 15 parts maleic anhydride.

RBS™ 25 solution is an alkaline liquid detergent available from Sigma-Aldrich

CS-1 is a caustic solution prepared as follows. 12 g of RBS™ 25 solution was mixed with 600 g of a 2% NaOH aqueous solution. Water was added until the solution reached a weight of 1,200 g.

DISP-1 is a cyan pigment dispersant prepared as follows:

900 g of EFKA™ 7701, 900 g of Heliogen™ Blue D 7110 F and 60 g of Stabi-1 were mixed into in 4,340 g of PEA using a DISPERLUX™ dispenser. Stirring was continued for 30 minutes. The vessel was connected to a DYNOT™-MILL ECM Poly mill from the company Willy A. Bachofen (Switzerland) filled for 42% with 0.4 mm yttrium stabilized zirconia beads ("high wear resistant zirconia grinding media" from TOSOH Co.). The mixture was circulated over the mill for a residence time of 20 minutes at a flow rate of 1.5 l/min and a rotation speed in the mill of about 13 m/s. During the complete milling procedure the content in the mill was cooled to keep the temperature below 40° C. After milling, the dispersion was discharged into a 15 L-vessel. The resulting concentrated pigment dispersion DISP-1 according to Table 2 exhibited an average particle size of 109 nm and a viscosity of 241 mPa·s.

TABLE 2

| Component | wt % |
| --- | --- |
| Heliogen ™ Blue D 7110 F | 15.0 |
| EFKA ™ 7701 | 15.0 |
| Stabi-1 | 1.0 |
| PEA | 69.0 |

DISP-2 is a concentrated white pigment dispersion having a composition according to Table 3.

TABLE 3

| wt % of component: | DISP-2 |
| --- | --- |
| TR52 | 50.0 |
| DB162 | 10.0 |
| Stabi-1 | 1.0 |
| VEEA | 39.0 |

The concentrated pigment dispersion DISP-2 was made by mixing 3.1 kg of VEEA, 28.5 kg of the white pigment TR52, 0.380 kg of the inhibitor Stabi-1 and 19.0 kg of a 30% solution of the polymeric dispersant DB162 in VEEA for 30 minutes in a 60 L vessel equipped with a DISPERLUX™ disperser (from DISPERLUX S.A.R.L., Luxembourg). This mixture was subsequently milled in a DYNOT™-MILL KD 6 from the company Willy A. Bachofen (Switzerland) using 0.65 mm yttrium-stabilized zirconium oxide-beads. The bead mill was filled for 52% with the grinding beads and operated in recirculation mode for 1 hour by using a tip speed of 14.7 m/s. The milling chamber is water-cooled during the operation. The resulting concentrated pigment dispersion DISP-2 exhibited an average particle size of 213 nm and a viscosity of 321 mPa·s.

DISP-3 is a concentrated cyan pigment dispersion having a composition according to Table 4.

TABLE 4

| wt % of component | DISP-3 |
| --- | --- |
| Hostaperm ™ Blue P-BFS | 15.0 |
| DB162 | 15.0 |
| Stabi-1 | 1.0 |
| DPGDA | 69.0 |

The concentrated cyan pigment DISP-3 was prepared by mixing 500 g of the polymeric dispersant DB162 and 33 g of the polymerization inhibitor Stabi-1 in 3870 g of DPGDA in a vessel of 6 L using a DISPERLUX™ disperser (from DISPERLUX S.A.R.L., Luxembourg). 1000 g of cyan pigment PB15:4 was added to the solution and stirred for 30 minutes. The vessel was then connected to a Bachofen DYNOMILL ECM Pilot mill having an internal volume of 1.5 L filled for 42% with 0.4 mm yttrium stabilized zirconia beads ("high wear resistant zirconia grinding media" from TOSOH Co.). The mixture was circulated over the mill for 2 hours and 18 minutes at a flow rate of about 2 L per minute and a rotation speed in the mill of about 13 m/s. 1667 g of a 30 wt % solution of DB162 in DPGDA was added to the pigment dispersion and circulated over the mill for another 20 minutes. During the complete milling procedure the content in the mill was cooled to a temperature of 42° C. After milling, the concentrated pigment dispersion was discharged into another 6 L vessel. The resulting concentrated pigment dispersion DISP-exhibited an average particle size of 103 nm and a viscosity of 238 mPa·s.

ITX is an isomeric mixture of 2- and 4-isopropylthioxanthone available as Darocur™ ITX from BASF.

IC907 is 2-methyl-1-[4-(methylthio)phenyl]-2-morpholino-propan-1-one, a photoinitiator available as Irgacure™ 907 from BASF.

IC819 is bis(2,4,6-trimethylbenzoyl)-phenylphosphineoxide, a photoinitiator available as Irgacure™ 819 from BASF.

TPO is 2,4,6-trimethylbenzoyl-diphenyl-phosphineoxide, a photoinitiator available as Darocur™ TPO from BASF.

IC127 is 2-hydroxy-1-{4-[4-(2-hydroxy-2-methyl-propionyl)-benzyl]-phenyl}-2-methyl-propan-1-one available as Irgacure™ 127 from BASF.

Omnipol™ TX is the di-ester of carboxymethoxy-thioxanthone and polytetramethyleneglycol 250, Average MW of 790 and available from IGM Resins, Waalwijk, NL.

Thioxantosol is a 22.5 wt % solution of purified Omnipol™ TX in VEEA. Omnipol™ TX was purified and dissolved in VEEA to ensure low levels of thioxanthone and catalyst in the end product. The purification involved a liquid extraction using Omnipol™ TX that was first dissolved in ethylacetate and then brought into contact with a solution of potassium carbonate in water. The purification step was done by allowing extraction between the two phases at 55° C. for about 1 hour and ended with a phase separation (30 minutes to separate). The water phase was removed after separation. This procedure was performed twice. Finally the ethylacetate is distilled from the solution and the remaining purified Omnipol™ TX is dissolved in VEEA at a concentration of 22.5 wt %.

SPEEDCURE™ 7040 is a polymeric 4-dimethylbenzoic acid derivative supplied by Lambson.

STAB UV10 is 4-hydroxy-2,2,6,6-tetramethylpiperidinooxy sebacate available as Irgastab™ UV 10 from BASF.

Stabi-1 is a mixture forming a polymerization inhibitor having a composition according to Table 5:

TABLE 5

| Component | wt % |
| --- | --- |
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminium N-nitrosophenylhydroxylamine from WAKO CHEMICALS LTD.

DPHA is dipentaerythritol hexaacrylate available as available as Miramer™ M600 from RAHN AG.

VEEA is 2-(vinyloxyethoxy)ethyl acrylate, a difunctional monomer available from NIPPON SHOKUBAI, Japan:

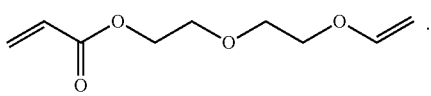

DPGDA is dipropyleneglycoldiacrylate available as Laromer™ DPGDA from BASF.

PEA is 2-phenoxyethyl acrylate available as Sartomer™ SR339C from SARTOMER.

M170 is 2-(2-ethoxy)ethyl acrylate (CASRN 7328-17-8) available as Miramer™ 170 from RAHN AG.

4-hydroxybutyl acrylate was supplied by Nippon Kasei.

PEG400DA is polyethylene glycol (MW400) diacrylate available as Sartomer™ SR344 from SARTOMER.

PEG200DA is polyethylene glycol (MW200) diacrylate available as Sartomer™ SR259 from SARTOMER having n=4:

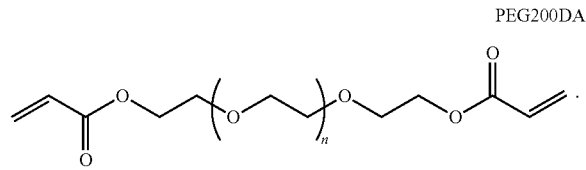

HDDA is 1,6-hexanediol diacrylate available as Sartomer™ SR238 from SARTOMER:

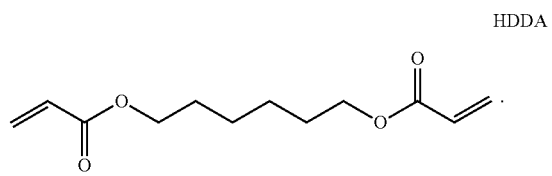 [SMILES: C=CC(=O)OCCCCCCOC(=O)C=C]

MON-1 is an oxalate monomer similar to PEG200DA:

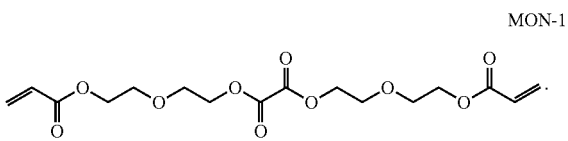 [SMILES: C=CC(=O)OCCOCCOC(=O)C(=O)OCCOCCOC(=O)C=C]

The synthesis of MON-1, i.e. oxalic acid bis-[2-(2-acryloyloxy-ethoxy)-ethyl]ester, was accomplished as follows:

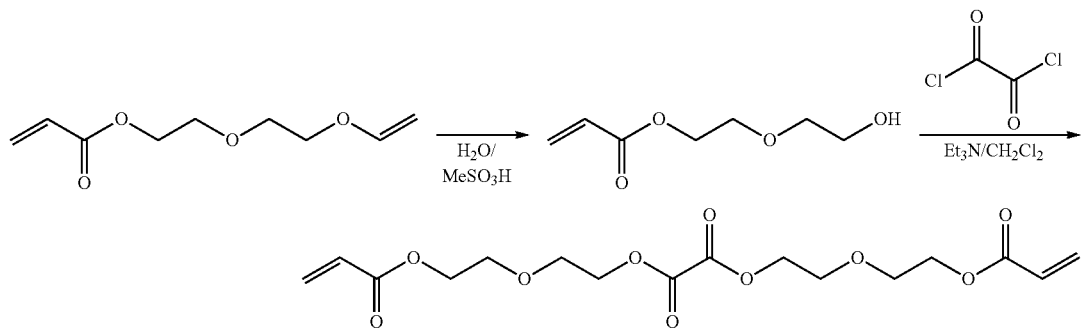

Step 1: synthesis of 2-(2-hydroxy-ethoxy)-ethyl acrylate :

55.9 g (0.3 mol) 2-(2-vinyloxy-ethoxy)-ethyl acrylate was dissolved in 100 ml acetone. 27 g (1.5 mol) water and 0.6 g (6 mmol) methane sulfonic acid was added. The reaction was allowed to continue for 4 hours at room temperature. The reaction mixture was diluted with 500 ml methylene chloride and extracted with 250 ml water. The organic fraction was dried over $MgSO_4$ and evaporated under reduced pressure. 2-(2-hydroxy-ethoxy)-ethyl acrylate was analyzed using TLC-chromatography (Partisil KC18F, supplied by Whatman, eluent:methanol/0.5 N NaCl 80/20, $R_f$: 0.83, only traces of (2-vinyloxy-ethoxy)-ethyl acrylate, $R_f$: 0.66 and a compound according to formula MON-3, $R_f$: 0.9).

MON-3

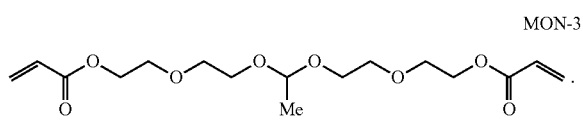 [SMILES: C=CC(=O)OCCOCCOC(C)OCCOCCOC(=O)C=C]

2-(2-hydroxy-ethoxy)-ethyl acrylate was used without further purification.

Step 2: synthesis of oxalic acid bis-[2-(2-acryloyloxy-ethoxy)-ethyl]ester :

30.4 g (0.19 mol) of 2-(2-hydroxy-ethoxy)-ethyl acrylate, 19.8 g (0.196 mol) triethyl amine and 1.3 g (5.7 mmol) BHT were dissolved in 140 ml methylene chloride. The solution was cooled to −10° C. A solution of 12.1 g (0.095 mol) oxalyl chloride in 70 ml methylene chloride was added dropwise, while maintaining the temperature at −10° C. The reaction was allowed to continue for 1 hour at 0° C., followed by reaction at room temperature for 16 hours. The reaction mixture was added to 200 g ice and the mixture was extracted with 200 ml methylene chloride. The organic fraction was extracted with 200 ml of a 1N hydrochloric acid solution, 200 ml of a satured $NaHCO_3$ solution and 200 ml of brine. The organic fraction was dried over Mg504 and evaporated under reduced pressure. The crude product was purified, using preparative column chromatography using a Prochrom LC80 column, packed with packed with Kromasil Si 60 å 10 µm and methylene chloride/ethyl acetate 90/10 as eluent. 19.1 g of oxalic acid bis-[2-(2-acryloyloxy-ethoxy)-ethyl]ester was isolated (y: 54%). The compound was analyzed using TLC-chromatography (TLC Silica gel 60 $F_{254}$, supplied by Merck, eluent:methylene chloride/ethyl acetate, 83/17, $R_f$: 0.42) and LC-MS, according to the method described below (retention time: 6.6 min, purity 96.2 area %).

MON-2 is an oxalate monomer similar to HDDA:

MON-2

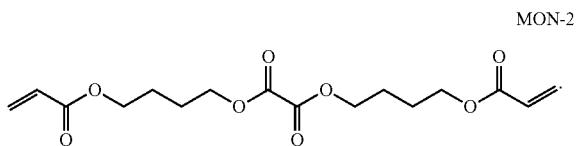 [SMILES: C=CC(=O)OCCCCOC(=O)C(=O)OCCCCOC(=O)C=C]

The synthesis of MON-2, i.e. oxalic acid bis-(4-acryloyloxy-butyl)ester was accomplished as follows:

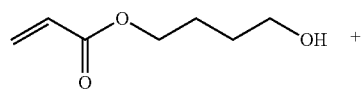

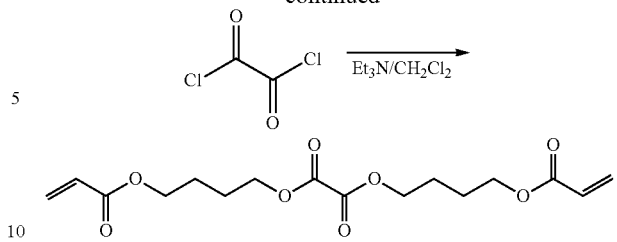

51.3 g (0.3 mol) 4-hydroxy-butyl acrylate, 31.4 g (0.31 mol) triethyl amine and 2 g (9 mmol) BHT were dissolved in 200 ml methylene chloride. The reaction mixture was cooled to −10° C. A solution of 19.0 g (0.15 mol) oxalyl chloride in 100 ml methylene chloride was added dropwise while maintaining the temperature at −10° C. The reaction was allowed to continue for 1 hour at 0° C., followed by reaction at room temperature for 16 hours. The reaction mixture was poured into 500 g ice and the mixture stirred for 1 hour. The mixture was extracted twice with 200 ml methylene chloride. The pooled organic fractions were extracted with 300 ml of a 1 N hydrochloric acid solution, 300 ml of a satured $NaHCO_3$ solution and twice with 200 ml of brine. The organic fraction was dried over $MgSO_4$ and evaporated under reduced pressure. The crude product was purified, using preparative column chromatography using a Prochrom LC80 column, packed with packed with Kromasil Si 60å 10 µm and methylene chloride/ethyl acetate 90/10 as eluent. 22 g of oxalic acid bis-(4-acryloyloxy-butyl)ester was isolated (y: 43%). The compound was analyzed, using TLC chromatography (TLC Silica gel 60 $F_{254}$, supplied by Merck, eluent:methylene chloride/ethyl acetate 96/4, $R_f$: 0.3), GC (retention time: 12.2 min, purity: 99.6 area %), and GC-MS, both according to the method described below.

IM30K Glass bubbles were glass bubbles having an average particle size of 15 µm and an average density of 0.63 $g/cm^2$ that are available as IM 30 K PERFORMANCE ADDITIVES from 3M.

BYK™ 333 is a polyether modified polydimethylsiloxane from BYK Chemie GmbH.

EFKA™ 7390 is a fluorocarbon modified polymer available from CIBA-GEIGY.

PET175 is a 175 µm thick unsubbed polyethylene terephtalate sheet available as Astera™ type U175.332 from AGFA-GEVAERT NV.

Paper-1 is a 80 $g/m^2$ paper substrate having a porosity of 0.36 Bekk and available as Fasson™ HGW Premium Paper 1S-80 available from AVERY DENNISON.

Custom Built Inkjet Printer

A custom built inkjet printer was used employing Agfa™ UPH print heads having 26 µm nozzles and jetting 8 picoliter droplets at a driving voltage of 17 V and at a jetting temperature of 45° C. Curing was performed using 4 W Phoseon 395 nm LED lamps. The substrate was transported under the printhead and the LED lamps at a speed of 24 m/min.

Measurement Methods

1. Viscosity

The viscosity of the primer was measured using a Brookfield DV-II+ viscometer at 45° C. at 12 rotations per minute (RPM) using a CPE 40 spindle. This corresponds to a shear rate of 1,000 $s^{-1}$.

2. Average Particle Size

The particle size of pigment particles in the inkjet ink was determined by photon correlation spectroscopy at a wavelength of 633 nm with a 4 mW HeNe laser on a diluted sample of the ink. The particle size analyzer used was a Malvern™ nano-S available from Goffin-Meyvis.

The sample was prepared by addition of one drop of inkjet ink to a cuvette containing 1.5 mL ethyl acetate and mixed until a homogenous sample was obtained. The measured particle size is the average value of 3 consecutive measurements consisting of 6 runs of 20 seconds.

3. Specific Weight after Curing

A specific weight after curing measured at 25° C. of the free radical curable liquid is less than 1.00 g/cm$^3$ if at least one of the following two criteria is fulfilled:

1) A cured layer of the free radical curable liquid is submersed in water at 25° C. If the cured layer floats on the surface of the water, then the specific weight after curing measured at 25° C. of the free radical curable liquid is less than 1.00 g/cm$^3$; and 2) The specific weight after curing was determined on a cured layer of the free radical curable liquid using an AccuPyc II 1340 Gas Displacement Density Analyzer from MICROMETRICS.

A sample was considered as cured at the moment scratching with a Q-tip caused no visual damage.

For obtaining solely the cured layer of the free radical curable liquid and not the substrate, a coating on a green coloured release foil attached to a Barlo™ XT pMMA followed by stripping of the cured layer can be performed as exemplified in EXAMPLE 2.

4. Recyclability

Twelve A4-size 175 μm unsubbed PET sheets (available as Astera™ type U175.332 from AGFA-GEVAERT NV) were coated with the free radical curable liquid using a bar coater and a 10 μm wired bar. All coated samples were cured using a Fusion DRSE-120 conveyer, equipped with a Fusion VPS/1600 lamp (H-bulb). The primed PET sheets were cured using a belt speed of 20 m/min and at full power of the lamp. Each primed PET sheet was passed three times under the lamp.

Each primed sheet was then printed with a UV curable cyan inkjet ink from the Agorix™ LM inkjet ink set and cured using the above disclosed custom built inkjet printer to deliver printed PET sheets.

The printed PET sheets were shredded using scissors into printed PET chips having a main surface area of approximately 1 cm$^2$. In the same way, unsubbed PET sheets were shredded into unsubbed PET chips having a main surface area of approximately 1 cm$^2$.

100 g of printed chips were physically mixed with 200 g of unsubbed PET chips, and then added to a container equipped with a stirrer and containing 1,200 g of caustic solution CS-1 at 85° C. The container was closed by a cap to minimize evaporation of water and the caustic solution having a temperature of 85° C. Stirring was stopped after 8 minutes. An evaluation was made if the layer of free radical curable liquid and inkjet ink floated or sunk to the bottom of the container.

If no inkjet ink was printed on the cured layer of free radical curable liquid, then preferably the free radical curable liquid included a colorant, such as e.g. Macrolex™ Blue 3R, to allow good differentiation with the colourless PET chips.

5. GC Analysis

The GC analysis was done on an Agilent™ 6890, using a DB1 column (30×0.25 0.25), helium as carrier gas at a flow rate of 2 ml/min and a split ratio of 50 to 1. A temperature profile was used, starting at 40° C. for 2 minutes and a temperature increase of 15° C. per minute up to a temperature of 200° C. 1 μl of a 1 w/w % solution of each compound in methylene chloride was injected.

6. GC-MS Analysis

The GC-MS analysis was done on a Trace™ Ultra-DSQ, using a DB-xlb column (30×0.25 0.25), helium as carrier gas at a flow rate of 1.2 ml/min and a split ratio of 50 to 1. A temperature profile was used starting at 80° C. and a temperature increase of 15° C. per minute up to 325° c. EI an PCI$_{(ammonia)}$ was used for recording the mass spectra. 1 μl of a 1 w/w % solution of each compound in methylene chloride was injected.

7. LC-MS Analysis

The LC-MS analysis was done on a Bruker™ HG Ultra, using an Altima™ HP C18 AQ column (150×3, 5 μm), operating at a flow rate of 0.35 ml/min and at 40° C. A gradient elution was used, with water as eluent A and acetonitrile as eluent B. The gradient was used shown in able 6.

TABLE 6

| Time | % B |
|------|-----|
| 0    | 45  |
| 6    | 45  |
| 11   | 100 |
| 30   | 100 |
| 31   | 45  |
| 38   | 45  |

ESI ionisation was used in combination with a combibron detector. 5 μl of a solution of 2 mg of each compound in 20 ml acetonitrile was injected.

Example 1

This example illustrates the recyclability of a PET substrate including a free radical curable liquid in accordance with a preferred embodiment of the present invention and a radiation curable inkjet ink by the sink float separation method, wherein the free radical crosslinkable polymer is a maleinised polybutadiene.

Preparation of Free Radical Curable Liquids

The comparative free radical curable liquids COMP-1 to COMP-3 and the inventive free radical curable liquids INV-1 to INV-6 were prepared according to Table 7 and Table 8. The weight percentage (wt %) was based on the total weight of the free radical curable liquids.

TABLE 7

| wt % of component: | COMP-1 | COMP-2 | COMP-3 |
|---|---|---|---|
| Lithene ™ PM 4 | 70 | — | — |
| Lithene ™ AL | — | 70 | — |
| Lithene ™ N4 B 10MA | — | — | 10 |
| Lithene ™ N4 5000 15MA | — | — | — |
| IC819 | 3 | 3 | 3 |
| Macrolex ™ Blue 3R | — | — | 1 |
| VEEA | 10 | 10 | 10 |
| DPGDA | 17 | 17 | 76 |

TABLE 8

| wt % of component: | INV-1 | INV-2 | INV-3 | INV-4 | INV-5 | INV-6 |
|---|---|---|---|---|---|---|
| Lithene ™ PM 4 | — | — | — | — | — | — |

TABLE 8-continued

| wt % of component: | INV-1 | INV-2 | INV-3 | INV-4 | INV-5 | INV-6 |
|---|---|---|---|---|---|---|
| Lithene ™ AL | — | — | — | — | — | — |
| Lithene ™ N4 B 10MA | 50 | 60 | 70 | — | — | — |
| Lithene ™ N4 5000 15MA | — | — | — | 70 | 80 | 90 |
| IC819 | 3 | 3 | 3 | 3 | 3 | 3 |
| Macrolex | 1 | 1 | 1 | 1 | 1 | 1 |
| VEEA | 10 | 10 | 10 | 10 | 10 | 2.5 |
| DPGDA | 36 | 26 | 16 | 16 | 6 | 3.5 |

Results and Evaluation

The free radical curable liquids COMP-1 to COMP-3 and INV-1 to INV-6 were coated on a PET175 substrate using a bar coater and a 10 μm wired bar. All coated samples were cured using a Fusion DRSE-120 conveyer, equipped with a Fusion VPS/1600 lamp (D-bulb). The samples were cured using a belt speed of 20 m/min and at full power of the lamp. Each sample was passed twice under the lamp.

The specific weight after curing and recyclability were evaluated. The recyclability with no ink means that, only the cured layer of the free radical curable liquid was evaluated, while the recyclability with ink means that the cured layer assembly of free radical curable liquid and the UV curable cyan inkjet ink from the Agorix™ LM inkjet ink set was evaluated. The results are shown in Table 9.

TABLE 9

| Cured layer of | Hydrolyzable groups present | Specific Weight after curing less than 1.00 g/cm³ | Recyclability No ink | Recyclability With ink |
|---|---|---|---|---|
| COMP-1 | No | Yes | Not OK | Not OK |
| COMP-2 | No | Yes | Not OK | Not OK |
| COMP-3 | Yes | No | Not OK | — |
| INV-1 | Yes | Yes | OK | OK |
| INV-2 | Yes | Yes | OK | OK |
| INV-3 | Yes | Yes | OK | OK |
| INV-4 | Yes | Yes | OK | OK |
| INV-5 | Yes | Yes | OK | OK |
| INV-6 | Yes | Yes | OK | OK |

From Table 9, the following should be clear. Firstly, if no hydrolyzable groups are present then recyclability test fails because there is no detachment of the cured layer of free radical curable liquid. Secondly, if the free radical crosslinkable polymer is present in the cured layer in an insufficient amount, then recyclability test fails because there is no flotation since the specific weight after curing is not less than 1.00 g/cm³. The recyclability test including the cyan inkjet ink from the Agorix™ LM inkjet ink set printed on the cured layer of COMP-3 was not performed because if no flotation can be achieved with the cured layer of COMP-3 alone, then flotation cannot improve by a combination with an inkjet ink.

The specific weight after curing of the cyan inkjet ink from the Agorix™ LM inkjet ink set by helium pycnometry using the AccuPyc II 1340 Gas Displacement Density Analyzer was determined to be 1.27 g/cm³. Therefore, the cyan inkjet ink on the cured layer of COMP-3 would even accelerate the sinking of the detached chips of a cured layer assembly of free radical cured liquid and cyan inkjet ink. These detached chips mix with the PET chips having a density of about 1.35, thereby making recyclability impossible.

It is necessary to determine the specific weight on the cured layer rather than on the liquid itself because free radical monomers like (meth)acrylates are known to have a considerable shrinkage after curing, often 10 to 15%, which consequently increases the specific weight. For example, the specific weight of the cyan inkjet ink from the Agorix™ LM inkjet ink set in liquid form is only 1.10 g/cm³ compared to the 1.27 g/cm³ in cured form as determined above.

Example 2

This example illustrates the flotation by usage of a free radical curable liquid in accordance with a preferred embodiment of the present invention that includes glass bubbles as hollow particles in the free radical curable liquid including photoinitiators and free radical polymerizable monomers or oligomers but lacking a free radical crosslinkable polymer.

Preparation of Free Radical Curable Liquid LIQ-A

A free radical curable liquid LIQ-A was prepared by mixing the components according to Table 10 under stirring for 90 minutes. The weight percentage (wt %) was based on the total weight of the free radical curable liquid.

TABLE 10

| Component | wt % |
|---|---|
| VEEA | 62.58 |
| IM30K Glass bubbles | 30.00 |
| IC819 | 3.00 |
| Thioxantosol | 2.35 |
| SPEEDCURE ™ 7040 | 2.00 |
| BYK ™ 333 | 0.07 |

Evaluation and Results

The free radical curable liquid LIQ-A was coated on the green coloured release foil attached to a Barlo™ XT pMMA substrate available from BARLO PLASTICS GmbH using a bar coater and a 10 μm wired bar. The coated liquid was cured in two passes on a belt using two 8W Phoseon 395 nm LED lamps at a belt speed of 30 m/min.

The cured sample of free radical curable liquid LIQ-A was then printed at full coverage by the custom built inkjet printer using a magenta inkjet ink of the Agorix™ LM inkjet ink set available from Agfa Graphics NV.

The layer assembly of free radical curable liquid LIQ-A and the magenta inkjet ink of the Agorix™ LM was stripped from the release foil and shredded using scissors into chips having a main surface area of approximately 1 cm². The layer assembly chips were submersed into the caustic solution CS-1 at 80° C. and immediately floated to the surface of the caustic solution CS-1.

In exactly the same manner as above the free radical curable liquid LIQ-A was coated and cured except that a PET175 substrate instead of on the green coloured release foil attached to a Barlo™ XT pMMA substrate. In the recyclability test, the layer assembly of free radical curable liquid LIQ-A and the magenta inkjet ink of the Agorix™ LM inkjet ink set was not able to detach from the printed PET chips. This shows that monomers or oligomers having hydrolyzable groups should be present in the free radical curable liquid LIQ-A.

Example 3

This example illustrates that monomers having a hydrolyzable group can be used in the free radical curable liquid for accomplishing detachment from a PET substrate of a cured layer of a free radical curable liquid lacking a free radical crosslinkable polymer with hydrolyzable groups.

Preparation of Free Radical Curable Liquids

Here a cyan pigment dispersion was used to include a colorant in the free radical curable liquids.

The comparative free radical curable liquids COMP-4 and COMP-5 and the inventive free radical curable liquids INV-7 and INV-8 were prepared by mixing the components according to Table 11. The weight percentage (wt %) was based on the total weight of the free radical curable liquid.

TABLE 11

| wt % of | COMP-4 | COMP-5 | INV-7 | INV-8 |
|---|---|---|---|---|
| DISP-1 | 16 | 16 | 16 | 16 |
| ITX | 5 | 5 | 5 | 5 |
| IC907 | 5 | 5 | 5 | 5 |
| IC819 | 3 | 3 | 3 | 3 |
| TPO | 2 | 2 | 2 | 2 |
| Stabi-1 | 1 | 1 | 1 | 1 |
| PEG200DA | 43 | 43 | — | — |
| HDDA | 25 | — | — | — |
| MON-1 | — | — | — | 43 |
| MON-2 | — | — | 25 | — |
| M170 | — | 25 | — | 25 |

Evaluation and Results

The free radical curable liquids COMP-4, COMP-5, INV-7 and INV-8 were coated on a PET175 substrate using a bar coater and a 10 μm wired bar. All coated samples were cured using a Fusion DRSE-120 conveyer, equipped with a Fusion VPS/1600 lamp (D-bulb). The samples were cured using a belt speed of 20 m/min and at full power of the lamp. Each sample was passed twice under the lamp.

Each cured sample was submersed in water, organic solvents and a 2% NaOH aqueous solution, and the detachment was evaluated. The results are shown in Table 12.

TABLE 12

| Submersion in | Detachment of a cured layer of | | | |
|---|---|---|---|---|
| | COMP-4 | COMP-5 | INV-7 | INV-8 |
| Water | None after 24 h | None after 24 h | None after 24 h | None after 24 h |
| Isopropanol | None after 24 h | None after 24 h | None after 24 h | None after 24 h |
| Ethanol | Immediate detachment | None after 24 h | None after 24 h | Slight detachment after 24 h |
| 2% NaOH solution | Slight detachment after 4 h | Slight detachment after 24 h | Full detachment after 10 min | Full detachment after 80 min |

From Table 12, it should be clear that only the inventive free radical curable liquids that contain a monomer with a hydrolyzable group allow controlling the adhesion in such a manner that detachment readily occurs in an alkaline aqueous solution but not in water or in organic solvents.

The fact that no detachment of the cured layer occurs in water, i.e. water fastness, is important since sometimes the content of a printed bottle needs to be kept cool in ice water without the printed matter being detached. Solvent resistance is important when the content of a printed bottle includes organic solvents, such as e.g. in a solvent paint where spillage could detach the printed safety instructions.

Since no hollow particles or the specific free radical crosslinkable polymer was present in the free radical curable liquids, any detached cured layer sank to the bottom of the container after submersion. For achieving flotation of the above free radical cured liquids, so that recycling by sink float separation becomes possible, the skilled person may simply add an amount of a free radical crosslinkable polymer like in Example 1 or an amount of glass bubbles as in Example 2.

Example 4

This example illustrates the effect of the thickness of the cured layer of the free radical curable liquid on the recyclability.

Preparation of Free Radical Curable Liquids LIQ-B and LIQ-C

A free radical curable liquids LIQ-B and LIQ-C was prepared by mixing the components according to Table 13 under stirring for 90 minutes. The weight percentage (wt %) was based on the total weight of the free radical curable liquid.

TABLE 13

| wt % of component: | LIQ-B | LIQ-C |
|---|---|---|
| Lithene ™ N4 5000 15MA | 70.0 | 90.0 |
| IC819 | 3.0 | 3.0 |
| Macrolex ™ Blue 3R | 0.5 | 0.5 |
| VEEA | 10.0 | 2.5 |
| DPGDA | 6.3 | 1.3 |
| PEG400DA | 10.0 | 2.5 |
| STAB UV10 | 0.2 | 0.2 |

Preparation of White Inkjet Ink W-1

A free radical curable white inkjet ink W-1 was prepared by mixing the components according to Table 14 under stirring for 90 minutes. The weight percentage (wt %) was based on the total weight of the free radical curable liquid.

TABLE 14

| wt % of component | W-1 |
|---|---|
| DISP-2 | 35.00 |
| DPGDA | 35.84 |
| VEEA | 12.50 |
| Stabi-1 | 0.65 |
| DPHA | 10.00 |
| IC127 | 3.00 |
| IC819 | 3.00 |
| BYK ™ 333 | 0.01 |

Preparation of Cyan Inkjet Ink C-1

A free radical curable white inkjet ink C-1 was prepared by mixing the components according to Table 15 under stirring for 90 minutes. The weight percentage (wt %) was based on the total weight of the free radical curable liquid.

TABLE 15

| wt % of component | C-1 |
|---|---|
| DISP-3 | 22.43 |
| DPGDA | 33.13 |
| VEEA | 7.90 |
| Stabi-1 | 0.78 |
| Thioxantosol | 23.43 |
| SPEEDCURE ™ 7040 | 5.00 |
| IC819 | 3.00 |
| DPHA | 4.00 |
| BYK ™ 333 | 0.03 |
| EFKA ™ 7390 | 0.30 |

Evaluation and Results

Several cured layer assemblies were prepared using the free radical curable liquids LIQ-B and LIQ-C as a primer and optionally also as a varnish and free radical curable inkjet inks W-1 and C-1.

The free radical curable liquid LIQ-B or LIQ-C was coated on a PET175 substrate using a bar coater and a 10 μm or a 20 μm wired bar. All coated samples were cured using a Fusion DRSE-120 conveyer, equipped with a Fusion VPS/1600 lamp (H-bulb). The samples were cured using a belt speed of 20 m/min and at full power of the lamp. Each sample was passed three times under the lamp.

Then, the free radical curable white inkjet ink W-1 was coated on each cured sample using a bar coater and a 10 μm wired bar. All coated samples were cured using a Fusion DRSE-120 conveyer, equipped with a Fusion VPS/1600 lamp (H-bulb). The samples were cured using a belt speed of 20 m/min and at full power of the lamp.

Then, the free radical curable cyan inkjet ink C-1 was coated on each cured sample using a bar coater and a 10 μm wired bar. All coated samples were cured using a Fusion DRSE-120 conveyer, equipped with a Fusion VPS/1600 lamp (H-bulb). The samples were cured using a belt speed of 20 m/min and at full power of the lamp.

If present, a layer of the free radical curable liquid LIQ-B or LIQ-C was coated on a PET175 substrate using a bar coater and a 10 μm or a 20 μm wired bar. All coated samples were cured using a Fusion DRSE-120 conveyer, equipped with a Fusion VPS/1600 lamp (H-bulb). The samples were cured using a belt speed of 20 m/min and at full power of the lamp. Each sample was passed three times under the lamp.

This resulted in the following ten cured layer assemblies according to Table 16. The indicated thickness D is the coated wet thickness.

TABLE 16

| | Cured layer assembly on PET175 substrate | | | | |
|---|---|---|---|---|---|
| | Primer | | White | Cyan | Varnish | |
| N° | Type | D (μm) | ink | ink | Type | D (μm) |
| 1 | LIQ-B | 10 | 10 | 10 | — | — |
| 2 | LIQ-C | 10 | 10 | 10 | — | — |
| 3 | LIQ-B | 20 | 10 | 10 | — | — |
| 4 | LIQ-C | 20 | 10 | 10 | — | — |
| 5 | LIQ-C | 10 | 10 | 10 | LIQ-B | 10 |
| 6 | LIQ-B | 10 | 10 | 10 | LIQ-B | 10 |
| 7 | LIQ-B | 10 | 10 | 10 | LIQ-C | 20 |
| 8 | LIQ-C | 20 | 10 | 10 | LIQ-B | 10 |
| 9 | LIQ-C | 20 | 10 | 10 | LIQ-C | 10 |
| 10 | LIQ-C | 20 | 10 | 10 | LIQ-C | 20 |

The recyclability of the cured layer assemblies was evaluated. All cured layer assemblies detached readily from the PET175 substrate in the caustic solution CS-1 at 85° C. The result for flotation depended on the amount of cured free radical curable liquid LIQ-B and/or LIQ-C versus the amount of cured white and cyan ink and also the amount of free radical crosslinkable polymer in the free radical curable liquid. The results for recyclability are shown in Table 17.

TABLE 17

| Cured layer assembly N° | Recyclability |
|---|---|
| 1 | Not OK |
| 2 | Not OK |
| 3 | Not OK |

TABLE 17-continued

| Cured layer assembly N° | Recyclability |
|---|---|
| 4 | Not OK |
| 5 | Not OK |
| 6 | Almost OK |
| 7 | OK |
| 8 | OK |
| 9 | OK |
| 10 | OK |

The specific weight after curing of the white and cyan inkjet ink after curing was 1.30 g/cm$^3$ and 1.26 g/cm$^3$ respectively. Although the cured primer layer had a specific weight after curing of less than 1.00 g/cm$^3$, the thickness of 10 μm cured primer layer was insufficient to compensate for the 20 μm thickness of the white and cyan ink in the cured layer assemblies N° 1 to 4. Even equal thickness of free radical curable liquids and inkjet ink cured layers was insufficient as can be seen in cured layer assembly N° 5. The improvement from cured layer assembly N° 6 to N° 7 was obtained due to the amount of free radical crosslinkable polymer in the free radical curable liquid LIQ-C.

If no "sandwich" layer assembly like in N° 5 to 10 is desired, then the thickness and/or the buoyancy of the primer should be increased. The buoyancy can easily be improved by partly or fully replacing the free radical crosslinkable polymer in LIQ-B or LIQ-C by e.g. the glass bubbles used in EXAMPLE 2. If the free radical crosslinkable polymer in LIQ-B or LIQ-C is fully replaced by glass bubbles then at least one free radical polymerizable monomer or oligomer including a hydrolyzable group, such as e.g. the oxalate monomers in EXAMPLE 3, should be added else the detachment of the cured layer assembly would be problematic as shown in EXAMPLE 2.

It is of course also possible to use a larger surface area coverage of free radical curable liquid compared to the surface area coverage of the inkjet ink in order to improve flotation. However, this only makes sense if careful or no shredding to chips takes place as in the PET recycling process, since chips where the surface area coverage of free radical curable liquid and inkjet ink is identical would then cause contamination of the pure PET chips. Hence it is preferred to control the buoyancy by the thickness of the layers rather than the surface area coverage.

It should by now be clear that mainly the amount of ink, i.e. thickness and surface area coverage of the ink layer(s), the use or not of a sandwich layer assembly, and the desired thickness of the primer layer will determine the composition of the free radical curable liquid required to ensure recyclability. In view of the details given in EXAMPLES 1 to 4, the design of such a free radical curable liquid would pose no problem for a person skilled in the art. The specific weight after curing of the free radical curable liquid can be controlled by the amount of hollow particles and/or a free radical crosslinkable polymer present in the liquid. In addition to the specific weight after curing of the free radical curable liquid, flotation of the cured layer assembly can be influenced by the thickness of the primer layer. If a thinner primer layer is required, then the skilled person may reduce the specific weight after curing of the free radical curable liquid further by increasing the amount of hollow particles and/or a free radical crosslinkable polymer present in the liquid, alternatively he can also introduce a thin varnish layer having a specific weight after curing measured at 25° C. of less than 1.00 g/cm$^3$.

Also the detachment of a cured layer assembly can be easily controlled by the person skilled in the art. As long that at least the free radical crosslinkable polymer or at least one of the one or more free radical polymerizable monomers or oligomers includes one or more hydrolyzable groups which upon hydrolyzation form an acid group or salt thereof, the detachment will occur. The speed of detachment depends also on external variables used in the recycling, e.g. the type of substrate, the pH and temperature of the caustic solution. If a faster detachment is required than the number of hydrolyzable groups which upon hydrolyzation form an acid group or salt thereof should be simply increased. If improved dry adhesion of the cured layer assembly is required to a specific substrate than the number of hydrolyzable groups which upon hydrolyzation form an acid group or salt thereof should be simply decreased. By incorporating the hydrolyzable groups in the one or more free radical polymerizable monomers or oligomers or in the free radical crosslinkable polymer, the hydrolyzed groups remain part of the cured layer assembly. Including a non-polymerizable, low molecular weight compound having hydrolyzable groups which upon hydrolyzation form an acid group or salt thereof, could due to their leaching in the recycling process lead to no or poor detachment of the cured layer assembly.

Example 5

This example illustrates the recyclability of paper substrates.
Preparation of Free Radical Curable Liquid LIQ-C
The same free radical curable liquid LIQ-C was prepared in exactly the same manner as in EXAMPLE 4.
Evaluation and Results
The free radical curable liquid LIQ-C was coated as a primer on 13 A4-size sheets of a paper substrate Paper-1 using a bar coater and a 10 μm wired bar. All coated samples were cured using a Fusion DRSE-120 conveyer, equipped with a Fusion VPS/1600 lamp (H-bulb). The samples were cured using a belt speed of 20 m/min and at full power of the lamp. Each sample was passed three times under the lamp.
An image was jetted and cured on the primer using the custom built inkjet printer and the free radical curable cyan inkjet ink C-1 of EXAMPLE 4 at a surface coverage of 50%.
The printed paper sheets were shredded using scissors into printed paper chips having a main surface area of approximately 1 cm². In the same way, unprimed and unprinted sheets were shredded into paper chips having a main surface area of approximately 1 cm².
25 g of printed chips were physically mixed with 50 g of unprimed and unprinted paper chips, and then added to a container equipped with a stirrer and containing 400 g of caustic solution CS-1 at 85° C. The container was closed by a cap to minimize evaporation of water and the caustic solution having a temperature of 85° C. Stirring was stopped after 8 minutes.
After two minutes it was seen that primer-ink layers detached from the paper substrate. The paper substrate rapidly turned into a high viscous paper pulp. After 8 minutes of stirring an enrichment of the curled primer-ink layers in the upper region of viscous paper pulp was observed. The paper pulp had a clear white colour indicating that there was no blue dye contamination of the paper pulp, i.e. an excellent paper pulp quality.
In an attempt to have a clear separation of paper pulp and the curled primer-ink layers, the mixture was diluted four times with water. However only a further swelling of the pulp was observed. It is believed that air bubbles pumped into the bottom region of a pulp as employed in a real paper recycling plant, would drag the curled primer-ink layers to the upper surface just like it does with colored particles and chips in conventional paper recycling. As a simple test, recovered primer ink layers were submerged in a container with caustic solution CS-1 at room temperature. The primer ink layers came readily floating to the surface of the caustic solution.

The invention claimed is:
1. A free radical curable liquid comprising:
one or more photoinitiators;
one or more free radical polymerizable monomers or oligomers; and
hollow particles and/or a free radical crosslinkable polymer selected from the group consisting of polyethylene, polypropylene, polybutadiene, polymethylpentene, poly(ethylene-vinylacetate), poly(ethylene-ethyl acrylate), and poly(styrene-butadiene) and copolymers thereof; wherein
at least the free radical crosslinkable polymer or at least one of the one or more free radical polymerizable monomers or oligomers includes one or more hydrolyzable groups which upon hydrolyzation form an acid group or salt thereof;
the free radical curable liquid contains no more than 10 wt % of organic solvent; and
the free radical curable liquid has a specific weight after curing measured at 25° C. of less than 1.00 g/cm³.
2. The free radical curable liquid according to claim 1, wherein the one or more free radical polymerizable monomers or oligomers include at least one free radical polymerizable group selected from the group consisting of an acrylate group, a methacrylate group, an acrylamide group, a methacrylamide group, a styrene group, a maleate group, a fumarate group, an itaconate group, a vinyl ether group, a vinyl ester group, an allyl ether group, and an allyl ester group.
3. The free radical curable liquid according to claim 1, wherein the free radical crosslinkable polymer is a maleinised polybutadiene.
4. The free radical curable liquid according to claim 1, wherein the free radical curable liquid contains no organic solvent.
5. The free radical curable liquid according to claim 1, further comprising a colorant.
6. The free radical curable liquid according to claim 5, wherein the colorant is a white inorganic pigment with a refractive index greater than 1.60.
7. The free radical curable liquid according to claim 1, wherein the hollow particles are made of glass or metal.
8. An inkjet printing method including the steps of:
applying a layer of free radical curable liquid as defined by claim 1 to a substrate;
at least partially curing the layer of free radical curable liquid;
jetting one or more free radical curable inkjet inks on the at least partially cured layer of free radical curable liquid; and
curing the one or more free radical curable inkjet inks.
9. The inkjet printing method according to claim 8, wherein a cured layer assembly of the free radical curable liquid and the one or more free radical curable inkjet inks has a specific weight after curing measured at 25° C. less than 1.00 g/cm³.

10. The inkjet printing method according to claim 9, wherein the one or more free radical curable inkjet inks include a polymeric or polymerizable photoinitiator.

11. The inkjet printing method according to claim 9, wherein the one or more free radical curable inkjet inks do not contain a dye soluble in an aqueous alkaline solution.

12. The inkjet printing method according to claim 9, wherein a density of the substrate is larger than 1.10 g/cm$^3$.

13. The inkjet printing method according to claim 9, wherein the substrate is a paper substrate or a polymeric substrate including a polymer selected from the group consisting of polycarbonate, polyvinyl chloride (PVC), polyethylene terephthalate (PET), polyethylene naphthalate (PEN) and polylactide (PLA), polyimide and copolymers thereof.

* * * * *